United States Patent
Griffin et al.

(10) Patent No.: US 12,301,708 B2
(45) Date of Patent: May 13, 2025

(54) CRYPTOGRAPHIC KEY MANAGEMENT FOR DISTRIBUTED QUANTUM COMPUTING SYSTEMS

(71) Applicant: Red Hat, Inc., Raleigh, NC (US)

(72) Inventors: Leigh Griffin, Waterford (IE); Stephen Coady, Dublin (IE)

(73) Assignee: Red Hat, Inc., Raleigh, NC (US)

( * ) Notice: Subject to any disclaimer, the term of this patent is extended or adjusted under 35 U.S.C. 154(b) by 234 days.

(21) Appl. No.: 18/190,296

(22) Filed: Mar. 27, 2023

(65) Prior Publication Data
US 2024/0333482 A1    Oct. 3, 2024

(51) Int. Cl.
*H04L 29/06* (2006.01)
*H04L 9/08* (2006.01)

(52) U.S. Cl.
CPC ............ *H04L 9/0852* (2013.01); *H04L 9/088* (2013.01)

(58) Field of Classification Search
CPC .............................. H04L 9/0852; H04L 9/088
See application file for complete search history.

(56) References Cited

U.S. PATENT DOCUMENTS

| 7,415,114 | B2 * | 8/2008 | Lo | H04L 9/0858 380/256 |
| 7,570,767 | B2 | 8/2009 | Lo | |
| 8,126,830 | B2 * | 2/2012 | Lloyd | G06F 16/903 706/45 |
| 10,103,880 | B2 * | 10/2018 | Fu | H04L 9/0897 |
| 10,708,046 | B1 | 7/2020 | Ashrafi | |
| 10,855,453 | B1 * | 12/2020 | Vakili | H04L 9/0844 |
| 10,891,555 | B2 | 1/2021 | Ashrafi | |
| 11,095,439 | B1 * | 8/2021 | Vakili | H04L 63/08 |
| 2021/0105130 | A1 * | 4/2021 | Griffin | H04L 63/107 |
| 2021/0109707 | A1 * | 4/2021 | McCarty | H04L 9/3236 |

FOREIGN PATENT DOCUMENTS

| TW | 202133056 A | 9/2021 |
| WO | 2019132680 A1 | 7/2019 |

OTHER PUBLICATIONS

Armanuzzaman et al., "A Secure and Efficient Data Transmission Technique Using Quantum Key Distribution", 2017 4th International Conference on Networking, Systems and Security (NSysS), Date of Conference: Dec. 18-20, 2017.*

Konyukhov, Vitaliy, "Mathematics of Post-Quantum Cryptography," Konyukhov.eu, https://konyukhov.eu/Vitaliy_Konyukhov_Senior_Thesis.pdf, May 11, 2022, 26 pages.

* cited by examiner

*Primary Examiner* — Morshed Mehedi
(74) *Attorney, Agent, or Firm* — Dority & Manning, P.A.

(57) ABSTRACT

A system comprises a first set of quantum hardware (QH) that includes a first set of qubits, a second set of QH that includes a second set of qubits, and a third set of QH. The first set of qubits encodes a first portion of a cryptographic key (CK). The second set of qubits encodes a second portion of the CK. In response to receiving an access request, the third set of QH receives from the first set of QH, a first transmission that encodes the first portion of the CK and a second transmission, from the second set of QH, that encodes the second portion of the CK. The third set of QH generates a first encoding of the CK that includes the first portion and the second portion of the CK. The system provides a requesting party a third transmission based on the first encoding of the CK.

20 Claims, 8 Drawing Sheets

CRYPTOGRAPHIC KEY MANAGEMENT FOR DISTRIBUTED QUANTUM COMPUTING SYSTEMS

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently and accurately allocate qubits in real time will be desirable.

SUMMARY

The examples disclosed herein provide archiving data via superdense coding and accessing data that has been archived via superdense coding. The embodiments employ a quantum mechanical mechanism referred to as superdense coding (or superdense encoding). Briefly, superdense coding is a QM encoding protocol that stores data in qubits. The number of qubits required to store the data is less than the number of classical bits that would be required to encode the same amount of data.

One embodiment includes a method for accessing a cryptographic key that is stored by a quantum computing system (QCS). The QCS comprises a first set of quantum hardware (QH) that includes a first set of allocated qubits, a second set of QH that includes a second set of allocated qubits, and a third set of QH. The method comprises receiving, at the QCS, an access request for the cryptographic key. The first set of allocated qubits encodes a first portion of the cryptographic key. The second set of allocated qubits encodes a second portion of the cryptographic key. In response to receiving the access request, the third set of QH receives, from the first set of QH, a first transmission that includes an encoding of the first portion of the cryptographic key. In response to receiving the access request, the third set of QH receives, from the second set of QH, a second transmission that includes an encoding of the second portion of the cryptographic key. The third set of QH generates a first encoding of the cryptographic key based on the first transmission from the first set of QH and the second transmission from the second set of QH. The first encoding of the cryptographic key encodes at least the first portion and the second portion of the cryptographic key. The QCS provides, to a requesting party that is associated with the access request, a third transmission that is based on the first encoding of the cryptographic key.

Another embodiment includes a method for storing a cryptographic key by a quantum computing system (QCS). The QCS comprises a first set of quantum hardware (QH), a second set of QH, and a set of accessible qubits. The method comprises receiving, at the QCS, a storage request to store the cryptographic key. The storage request indicates a classical encoding of the cryptographic key via a set of classical bits. In response to receiving the storage request, the QCS distributes a quantum-mechanical encoding of the cryptographic key across at least a first set of allocated qubits and a second set of allocated qubits based on the classical encoding of the cryptographic key. The first set of allocated qubits is a first subset of the set of accessible qubits and is stored at the first set of QH. The second set of allocated qubits is a second subset of the set of accessible qubits and is stored at the second set of QH.

Another embodiment is directed to a quantum computing system (QCS). The quantum computing device comprises a first set of quantum hardware (QH), a second set of QH, a third set of quantum hardware, a system memory, and a processors device that is communicatively coupled to the system memory. The first set of quantum hardware includes a first set of allocated qubits that encodes a first portion of a cryptographic key. The second set of QH includes a second set of allocated qubits that encodes a second portion of the cryptographic key.

The QCS receives an access request for the cryptographic key. In response to receiving the access request, the third set of QH receives, from the first set of QH, a first transmission that includes an encoding of the first portion of the cryptographic key. In response to receiving the access request, the third set of QH receives, from the second set of QH, a second transmission that includes an encoding of the second portion of the cryptographic key. The third set of QH generates a first encoding of the cryptographic key based on the first transmission from the first set of QH and the second transmission from the second set of QH. The first encoding of the cryptographic key encodes at least the first portion and the second portion of the cryptographic key. The QCS provides, to a requesting party that is associated with the access request, a third transmission that is based on the first encoding of the cryptographic key.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
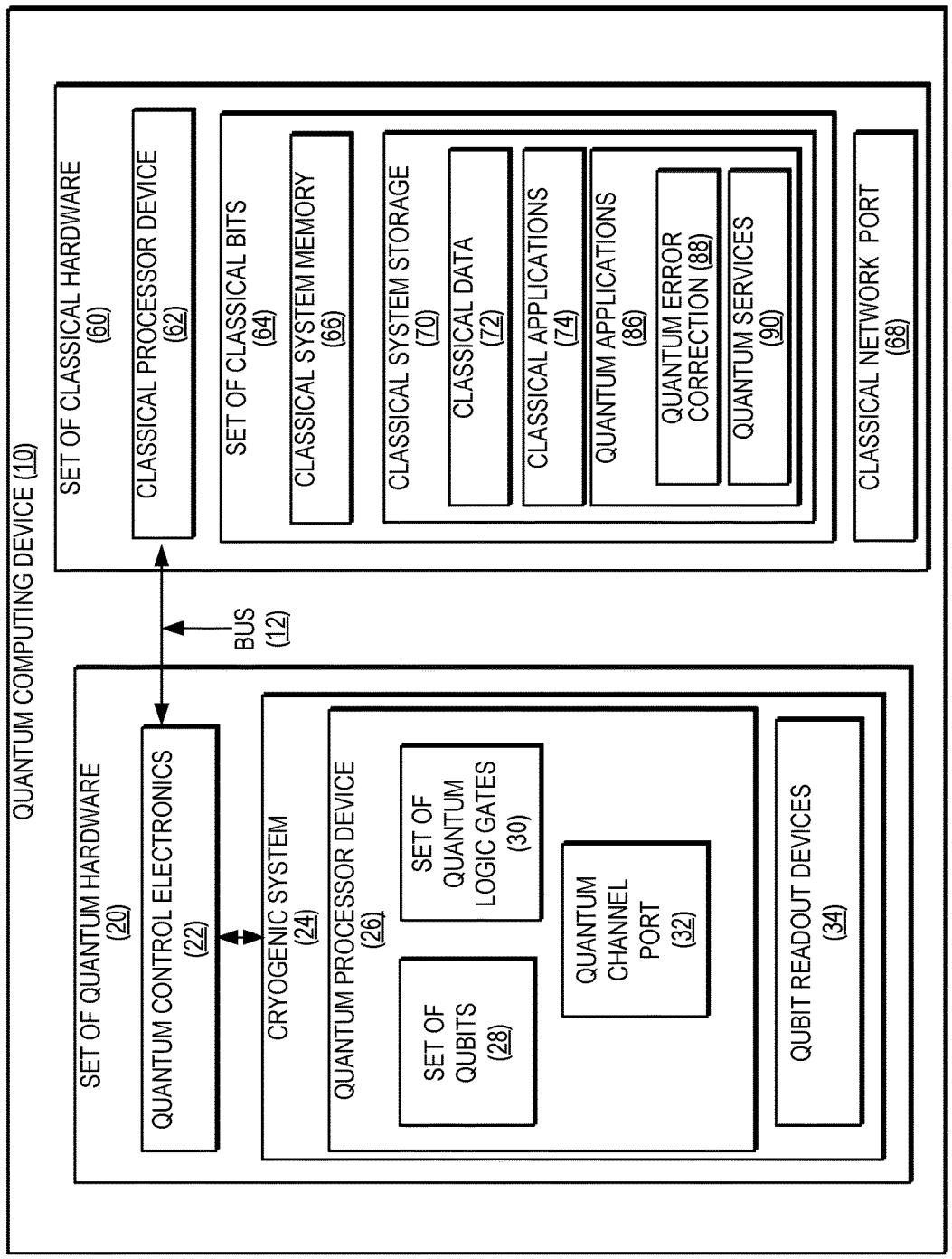
FIG. 1 is a block diagram of a quantum computing device, according to various embodiments.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing and quantum information processing involve the use of quantum bits, referred to herein as "qubits," which have characteristics that differ from those of classical (i.e., non-quantum) bits used in classical computing. Qubits may be employed by quantum services that are executed by quantum computing devices. In contrast to classical bits, which store classical encodings of data, the superposition of quantum states of qubits may be employed to store a quantum-mechanical (QM) encoding of the data. The embodiments employ QM encoding to store, manage, and distribute cryptographic keys.

The embodiments are directed to cryptographic key distribution and management. The embodiments may include and/or be implemented in quantum computing systems (QCSs). More specifically, the embodiments are directed towards employing a QCS to store, manage, retrieve, and provide encodings of cryptographic keys. The encodings of a cryptographic key may be quantum mechanical in nature (e.g., employing qubits to encode at least portions of a cryptographic key) and/or classical in nature (e.g., employing classical bits to encode at least a portion of the cryptographic key). Various embodiments may be enabled to convert from classical encodings of the cryptographic key to quantum mechanical encodings of a cryptographic key, and convert back to a classical encoding. Similarly, the various embodiments may be enables to convert quantum mechanical encodings, to classical encodings, and convert back to a quantum mechanical encoding. The embodiments are enabled to receive, store, and distribute quantum mechanical and/or classical encodings of cryptographic keys. Thus, the embodiments are directed to various mechanisms and systems for quantum key distribution (QKD).

The embodiments employ qubits for the storage and distribution of keys due to the inherent mobility qubits, as well as their ability to encode information through the superposition principle. The embodiments include a mechanism that receives a key of length n classical bits, where n is a positive integer. In some embodiments, the key may be stored in n/2 qubits (e.g., by employing superdense encodings). The number of qubits required for a quantum mechanical encoding is determined. As discussed further below, a QCS may include multiple instances of quantum computing devices (or sets of quantum hardware). The multiple instances of quantum computing devices may be spatially distributed. The number of available instances of quantum computing devices is also determined. The quantum mechanical encoding of key may be distributed across multiple quantum computing devices (or sets of quantum hardware). The spatial distribution of the quantum mechanical encodings may ensure that if a single set of quantum hardware is compromised, the integrity of the encoding of the key is not put at risk, and the key may be accessed with confidence in its fidelity.

When the key is to be retrieved, the spatially distributed encoding qubits (or quantum states of the encoding qubits) may be centralized (via qubit transport over quantum channels, teleportation, or qubit swap operations) may be centralized at a single set of quantum hardware. The encoding qubits may be in superposition. In such superposition embodiments, an algorithm that identifies an energy minimum of the encoding qubits (in superposition) may be employed to decode the key (e.g., by measuring the quantum states of the encoding qubits). Once decoded (e.g., generating a classical encoding based on measuring the quantum states of the encoding qubits), the key may be provided to a requesting machine, application, or party by assembling the key fragments in the correct order. In various embodiments, a classical encoding of the key may be provided. In other embodiments, a quantum mechanical encoding may be provided via a quantum channel, quantum teleportation, or qubit swap operation. Thus, the embodiments provide an effective means of making the key available to any service within quantum and/or classical computing systems.

For the embodiments, a QCS may include multiple instances of quantum computing devices (or multiple instances of sets of quantum hardware). A quantum computing device may include a set of quantum hardware (e.g., a set of quantum computing hardware). A set of quantum hardware may include one or more quantum processor devices. A quantum processor device may include a set of qubits as well as a set of logic gates. A set of quantum hardware may additionally include a set of qubit readout devices. In at least one embodiment, a set of quantum hardware may include a quantum channel port that enables the transmission and reception of qubits (or quantum states of qubits) to and from other sets of quantum hardware (e.g., other sets of quantum hardware included in other quantum computing devices).

In addition to a set of quantum hardware, some quantum computing devices may include a set of classical hardware (e.g., a set of classical computing hardware). A set of classical hardware may be equivalent (or at least similar to) a classical computing device. For instance, a set of classical hardware may include similar components to a classical computer (e.g., a classical processor device, classical system memory, classical system storage, and a network port for a classical communication network). A communication bus may exist between the set of quantum hardware and the set of classical hardware such that processor instructions and data may be exchanged between the set of quantum hardware and the set of classical hardware. The multiple instances of set of quantum hardware (or quantum computing devices) includes in a single QCS may be spatially distributed. That is, a QCS of the embodiments may be a distributed QCS.

FIG. 1 is a block diagram of a quantum computing device 10, according to various embodiments. The quantum computing device 10 comprises a set of quantum hardware 20. In various embodiments, a quantum computing device includes a set of classical hardware 60. The set of quantum hardware 20 may include quantum control electronics 22 and a cryogenic system 24. Within the cryogenic system 24, there may be a quantum processor device 26. The quantum processor device 26 may include a set of qubits 28 and a set of quantum logic gates 30 enabled to perform quantum logic operations on qubits (or pairs of qubits) of the set of qubits 28. The quantum processor device 26 may also include a quantum channel port 32. Within the cryogenic system 24, the set of quantum hardware 20 may also include qubit readout devices 34. The cryogenic system 24 may be enabled to maintain an ambient temperature that is relatively near absolute zero (e.g., on the order of a few millikelvins or tens of millikelvins) for the coherent operation of the quantum processor device 26 and the qubit readout devices 34. For instance, the low ambient temperature of the cryogenic system 24 may maintain the coherence of the set of qubits 28 and keep the qubits' wavefunction coherent and unentangled with a wavefunction of an object outside of the cryogenic system 24. It should be noted that the combination of components included in the set of quantum hardware 20 and the specifics of its architecture may vary in the embodiments. However, the functionality of the set of quantum hardware 20 may be modeled as a universal Quantum Turing Machine (QTM). Thus, the set of quantum hardware 20 is enabled to perform various quantum computations and information processing that are associated with a QTM model.

The set of classical hardware 60 may be similar to a classical computing device. As such, the architecture of the set of classical hardware 60 may be similar to the von Neumann computer architecture or model. For instance, the set of classical hardware 60 may include a classical processor device 62 and a set of classical bits 64. The set of classical bits 64 may include classical system memory 66 and classical system storage 70. The classical system storage 70 may include classical data 72, classical applications 74, and quantum applications 86. The set of quantum applications 86 may include codes for quantum error correctio (QEC) 88 (e.g., topological surface codes) and various quantum services 90. The set of classical hardware 60 may also include a classical network port 68. The classical network port 68 may enable the transmission and reception of classical communication signals over a classical communication network. Thus, the quantum computing device 10 (through the classical network port 68 and the quantum channel port 32) may be communicatively coupled to other quantum computing devices and/or classical computing devices.

It should be noted that the combination of components included in the set of classical hardware 60 and the specifics of its architecture may vary in the embodiments. However, the functionality of the set of classical hardware 60 may be modeled as a universal Classical Turing Machine (CTM). Thus, the set of classical hardware 60 is enabled to perform various classical computations and information processing that are associated with a CTM model.

Each qubit of the qubits of the set of qubits 28 may be characterized by a set of discretized quantum states, a subset of which may be computational quantum states. The quantum states of a qubit may be characterized as a vector in a complex Hilbert space (e.g., a vector with complex components). In some embodiments, the computational states of a qubit may be represented by points on Bloch sphere. Quantum states of multiple qubits of the set of qubits 28 (or subsets of qubits) may be characterized via tensor products generating Hilbert spaces of greater dimensions. The computational states of multi-qubit configurations may be represented as points on a hyper-Bloch sphere. In various embodiments, the number of dimensions of the Hilbert spaces and/or hyper-Bloch spheres may grow exponentially with the number of qubits (e.g., $\propto 2^n$). Various technologies may implement the qubits of the set of qubits 28, such as but not limited to superconducting qubits (e.g., transmon qubits). The near-absolute zero temperature of the cryogenic system 24 may enable the coherence of the qubits.

The set of logic quantum logic gates 30 may include single qubit gates. Such single qubit gates may include, but are not limited to Pauli X, Y, and Z gates, as well as Hadamard (H) gates, generalized phase shift gates (e.g., S and/or T gates), and the like. Single qubit gates may be employed to rotate the quantum state of a qubit around its associated Bloch sphere representation. For instance, an H gate may be employed to set up a state of superposition for a qubit. The set of quantum logic gates 30 may also include multi-qubit gates. Such multi-qubit gates may include but are not otherwise limited to controlled not (CNOT) gates, controlled Z (CZ) gates, swap gates, Toffoli gates, and the like. Multi-qubit gates may be employed to rotate the quantum state of subsets of qubits around their associated hyper-Bloch sphere representation. For instance, a CNOT gate may be employed to generate a state of entanglement between a pair of qubits. States of entanglement may include maximally entangled states between multiple qubits (e.g., Bell states). A quantum channel port 32 may be employed to transport qubits, or at least quantum states of qubits, to another quantum computer device via a quantum channel, quantum teleportation, quantum swap operations, or the like.

The qubit readout devices 34 may be employed measure (or read) a quantum state of a qubit. A qubit read device of the qubit readout devices 34 may be associated with a set of eigenstates, a subset of which may include computational eigenstates. A pair of computational eigenstates for a qubit readout device may be associated with a pair of antipodal points on the measured qubit's Bloch sphere representation. A quantum state that is not co-located with one of the points of the readout device's associated pair of antipodal points may be said to be in superposition. When a qubit is measured (or read) by a qubit readout device, if its quantum state is not already co-located at one of the readout device's antipodal points, then the quantum state will stochastically "snap" to one of the two antipodal points. This may be referred to as the "collapse" of the qubit's wavefunction under the Copenhagen interpretation (or alternatively as "branching" of the wavefunction in an Everettian "Many-Worlds Interpretation (MW)"). If the quantum state is already at one of the antipodal points, it will remain at the antipodal point, until perturbed (e.g., operated on by a quantum logic gate).

A quantum channel port 32 may enable the transport of a qubit (or its quantum state) to another set of quantum hardware. For instance, a qubit of the set of qubits 28 may be physically transmitted to another set of qubits (e.g., included in another set of quantum hardware and/or another quantum computing device) over a quantum channel. In other embodiments, the quantum state of the qubit may be quantum-mechanically teleported to another qubit. In still other embodiments, the quantum state of the qubit may be swapped with another qubit via a swap operation (e.g., via an application of a swap gate).

The quantum control electronics 22 generate and receive various analog and/digital signals for operating (e.g., providing instructions), as well as providing inputs and receiving outputs (I/O operations) to the quantum processing device 26 and qubit readout devices 34. A communication bus (e.g., bus 12) may enable analog and/or digital communications between the set of quantum hardware 20 and the set of classical hardware 60. In some embodiments, the classical processor device 42 may enable the generation of signals to the quantum control electronics 22 and/or received signals from the quantum control electronics 22.

Figure 2:
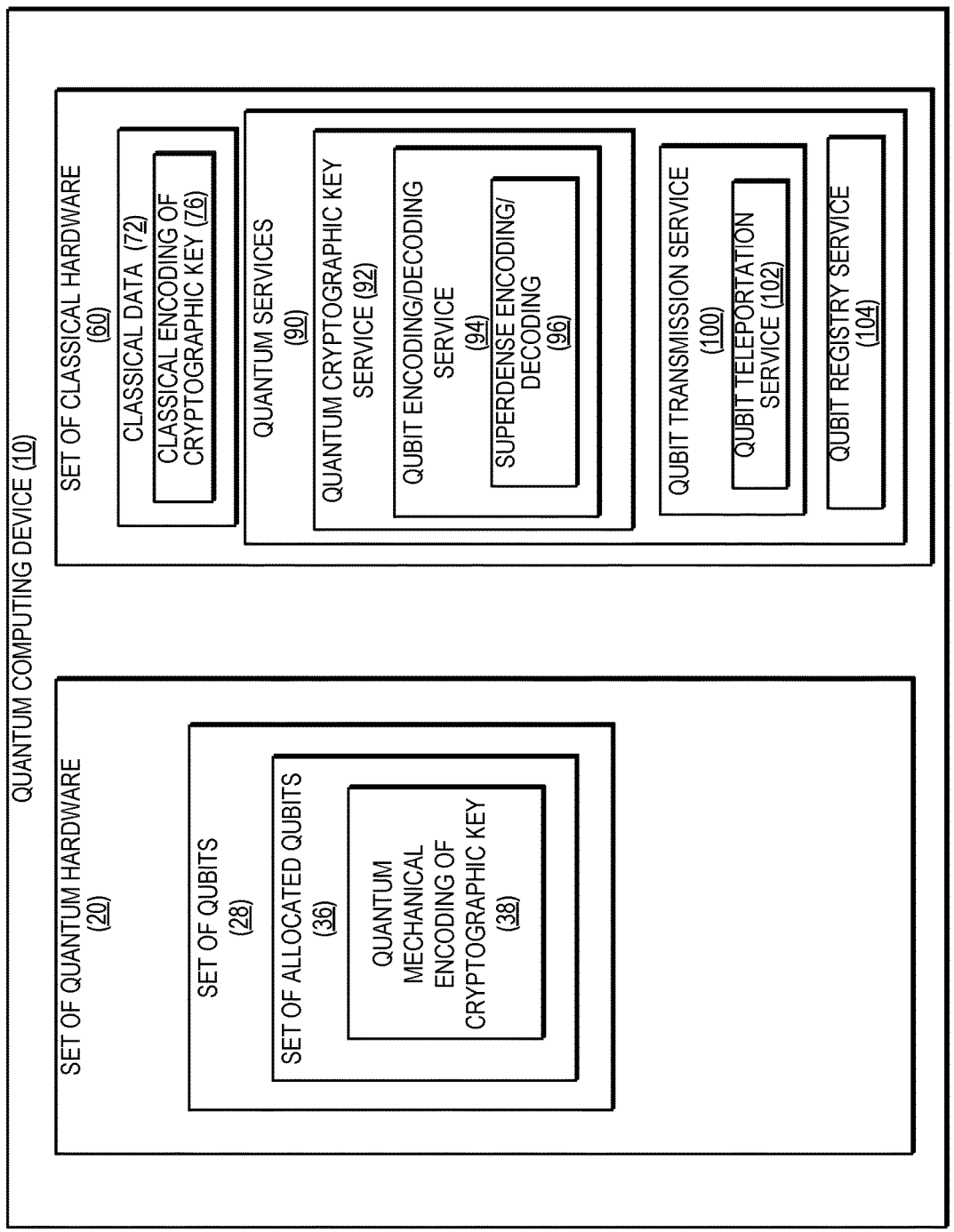
FIG. 2 is a block diagram of the quantum computing device of FIG. 1 that provides additional components according to at least some of the embodiments.

FIG. 2 is a block diagram of the quantum computing device 10 of FIG. 1 that provides additional components according to at least some of the embodiments. In FIG. 2, the set of qubits 28 (of the set of quantum hardware 20) includes a set of allocated qubits 36. The set of allocated qubits 36 may be allocated for various quantum computation and/or quantum information processing tasks. For instance, at least a subset of the set of allocated qubits 36 may be allocated for a quantum mechanical encoding of a cryptographic key 38. The set of classical data 72 (of the set of classical hardware 60) may include a classical encoding of the cryptographic key 76.

The quantum services 90 (of the quantum applications 86) may include a quantum cryptographic key service 92, a qubit transmission service 100, and a qubit registry service 104. The quantum cryptographic key service 92 may be enabled to perform various tasks associated with the cryptographic key distribution and management services of the various embodiments. That is, the quantum cryptographic key service 92 may be enabled to quantum mechanically encoding, store, manage, and distribute cryptographic keys. As such, the quantum cryptographic key service 92 may include a qubit encoding/decoding service 94. The qubit encoding/decoding service 94 may be enabled to encode and decode the information encoded in the various qubits of the set of qubits 28. For instance, the qubit encoding/decoding service 94 may encode the quantum mechanical encoding of the cryptographic key 38 in at least a subset of the set of allocated qubits 36. That is, the qubit encoding/decoding service 94 may perform a "quantum mechanical write" operation. The qubit encoding/decoding service 94 may additionally perform a "quantum mechanical read" operation. That is, the qubit encoding/decoding service 94 may decode the quantum mechanical encoding of the cryptographic key 38. In some embodiments, the encoding and decoding of information stored in qubits may be performed via superdense coding mechanism. In such embodiments, the qubit encoding/decoding service 94 may include a superdense encoding/decoding 96 module.

The quantum services 90 may also include a qubit transmission service 100. The qubit transmission service 100 is enabled to transmit (or transport) qubits (or at least the quantum states of qubits) to another quantum computing device (or another set of quantum hardware). The qubits may be physically transmitted over a quantum channel. In other embodiments, the quantum states of various qubits may be teleported to other qubits via quantum teleportation mechanisms or swap logic operations. Thus, in some embodiments, the qubit transmission service 100 may include a qubit teleportation service 102.

The quantum services 90 may also include a qubit registry service 104. The qubit registry service 104 is generally responsible in allocating and registering the allocated qubits to various quantum services and quantum computation/information processing tasks. For instance, the qubit registry service 104 may be enabled to allocate (and register) the qubits of the set of allocated qubits 36 for various quantum services, including the quantum mechanical encoding of the cryptographic key 38.

Figure 3:
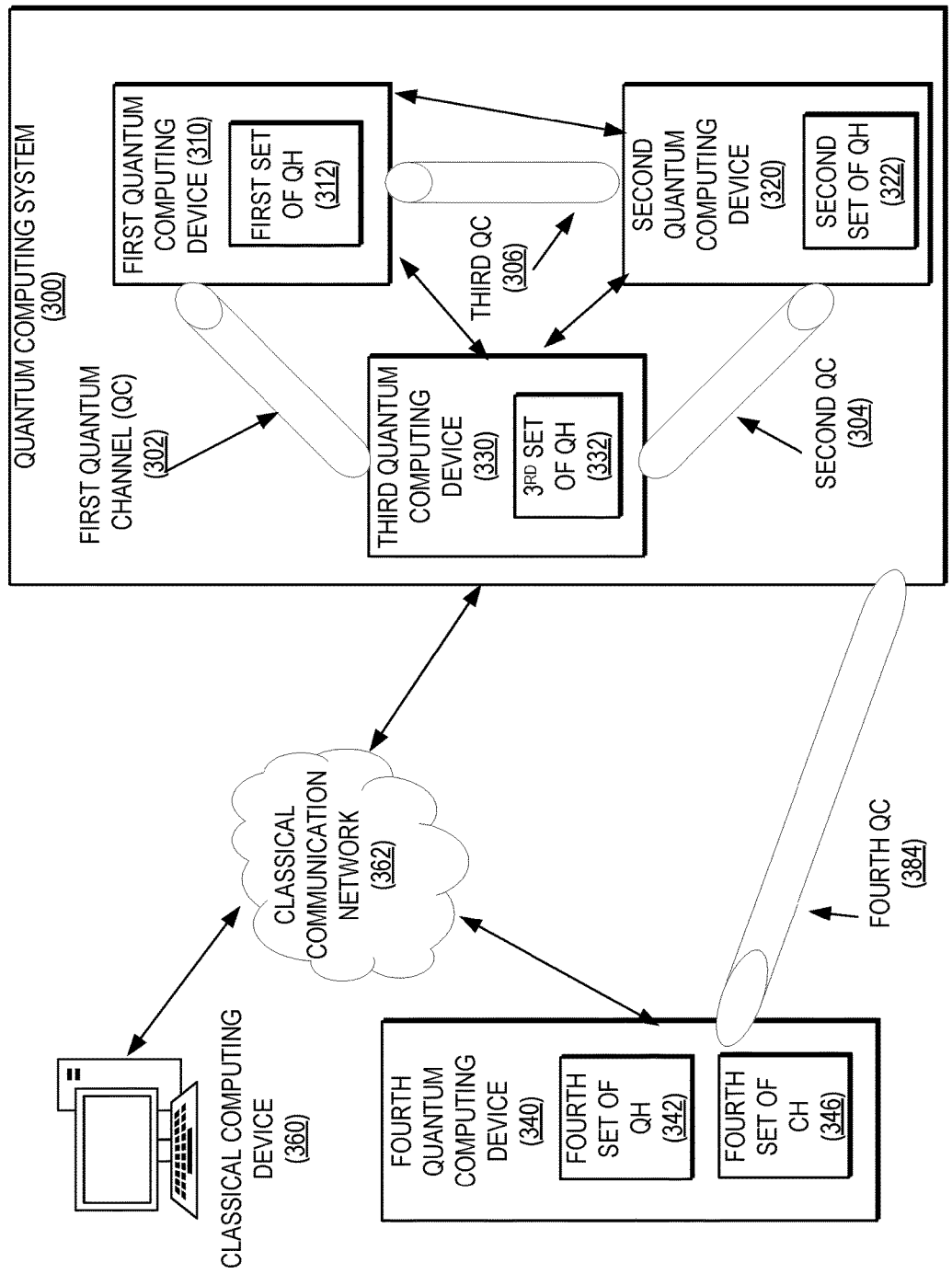
FIG. 3 is a block diagram of a quantum computing system, according to various embodiments.

FIG. 3 is a block diagram of a quantum computing system (QCS) 300, according to various embodiments. QCS 300 may include at least a first quantum computing device 310, a second quantum computing device 320, and a third quantum computing device 330. Each of the first quantum computing device 310, the second quantum computing device 320, and the third quantum computing device 330 may be similar to quantum computing device 10 of FIGS. 1-2. As such, the first quantum computing device 310 may include a first set of quantum hardware 312 that is similar to the set of quantum hardware 20 of quantum computing device 10. Likewise, the second quantum computing device 320 may include a second set of quantum hardware 322 that is similar to the set of quantum hardware 20 and the third quantum computing device 330 may include a third set of quantum hardware 332 that is similar to the set of quantum hardware 20. Although not shown explicitly in FIG. 3, the first quantum computing device 310 may include a first set of classical hardware similar to the set of classical hardware 60 of FIGS. 1-2. Likewise, the second quantum computing device 320 may include a second set of classical hardware similar to the set of classical hardware 60 and the third quantum computing device 330 may include a third set of classical hardware similar to the set of classical hardware 60.

Each of the first quantum computing device 310, the second quantum computing device 320, and the third quantum computing device 330 may be spatially remote from one another. However, qubits (or quantum states of qubits) may be transmitted, transported, swapped, exchanged, and/or teleported between the third quantum computing device 330 and the first quantum computing device 310 via a first quantum channel (QC) 302 of the QCS 300. A second QC 304 may similarly enable the transmission of qubits (or quantum states of qubits) between the third quantum computing device 330 and the second quantum computing device 320. Likewise, a third QC 306 may enable the transmission of qubits (or quantum states of qubits) between the first quantum computing device 310 and the second quantum computing device 320. Thus, the quantum computing devices 310/320/330 may exchange and/or transmit quantum information (e.g., encoded in qubits) via the first QC 302, the second QC 304, and the third QC 306. The sets of classical hardware of the first quantum computing device 310, the second quantum computing device 320, and the third quantum computing device 330 may exchange and/or transmit classical information via a wireless and/or wired communication network, as indicted by the bi-directional arrows connecting the quantum computing devices. Note that the configuration of QCS 300 is not limited to that shown in FIG. 3, and the QCS 300 may include fewer or additional quantum computing devices and QCs. In some embodiments, at least two quantum computing devices included in the QCS 300 may not be spatially remote from one another.

The QCS 300 may be enabled to exchange (e.g., transmit to and/or receive from) classical information to a classical computing device 360 and/or a fourth quantum computing device 340. The classical computing device 360 and/or the fourth quantum computing device 340 may (or may not be) spatially remote from the quantum computing system 300. In some embodiments, the fourth quantum computing device 340 may be included in another quantum computing system. In at least one embodiment, at least one of the classical computing device 360 or the fourth quantum computing device 340 may be included in the QCS 300.

The fourth quantum computing device 340 may include a fourth set of quantum hardware 342 that is similar to the set of quantum hardware 20 of FIGS. 1-2. Also, the fourth quantum computing device 340 may include a fourth set of classical hardware 346 that is similar to the set of classical hardware 60 of FIGS. 1-2. Qubits (or quantum states of qubits) may be transmitted, transported, swapped, exchanged, and/or teleported between the QCS 300 and the fourth quantum computing device 340 via a fourth QC 384.

The QCS 300 is enabled to perform cryptographic key storage, distribution, and management. More specifically, the QCS 300 is enabled to store, manage, retrieve, and provide encodings of cryptographic keys. The cryptographic key service 92, along with the qubit transmission service 100 and qubit registry service 104 of FIG. 2 enables many of the functionalities of the cryptographic key storage, distribution, and management service of the QCS 300. The encodings of a cryptographic key may be quantum mechanical in nature (e.g., employing qubits to encode at least portions of a cryptographic key) and/or classical in nature (e.g., employing classical bits to encode at least a portion of the cryptographic key). For instance, the quantum mechanical encoding of cryptographic key 38 of FIG. 2 is encoded in at least a subset of the set of allocated qubits 36. The classical encoding of the cryptographic key 76 of FIG. 2 is encoded in the classical data 72.

The QCS 300 is enabled, via the qubit encoding/decoding service 94 of FIG. 2, to convert from classical encodings of the cryptographic key to quantum mechanical encodings of a cryptographic key and convert back to a classical encoding. Similarly, the qubit encoding/decoding service 94 of the QCS 300 is enabled to convert quantum mechanical encodings, to classical encodings, and convert back to a quantum mechanical encoding. Thus, the QCS 300 is enabled to receive, store, and distribute quantum mechanical and/or classical encodings of cryptographic keys. The quantum cryptographic key service 92 of the QCS 300 is enabled with various mechanisms and systems for quantum key distribution (QKD). The QCS 300 employs qubits for the storage and distribution of keys due to the inherent mobility qubits, as well as their ability to encode information through the superposition principle. The qubit registry service 104 of FIG. 2 may identify, allocate, and register qubits for the storage of the quantum mechanical encoding of the cryptographic key 38. The qubits of the quantum mechanical encoding of the cryptographic key 38 may be spatially distributed across two or more spatially remote sets of quantum hardware of the QCS 300 (e.g., the first quantum computing device 310, the second quantum computing device 320, the third quantum computing device 330, and/or additional quantum computing devices included in QCS 300).

Figure 4A:
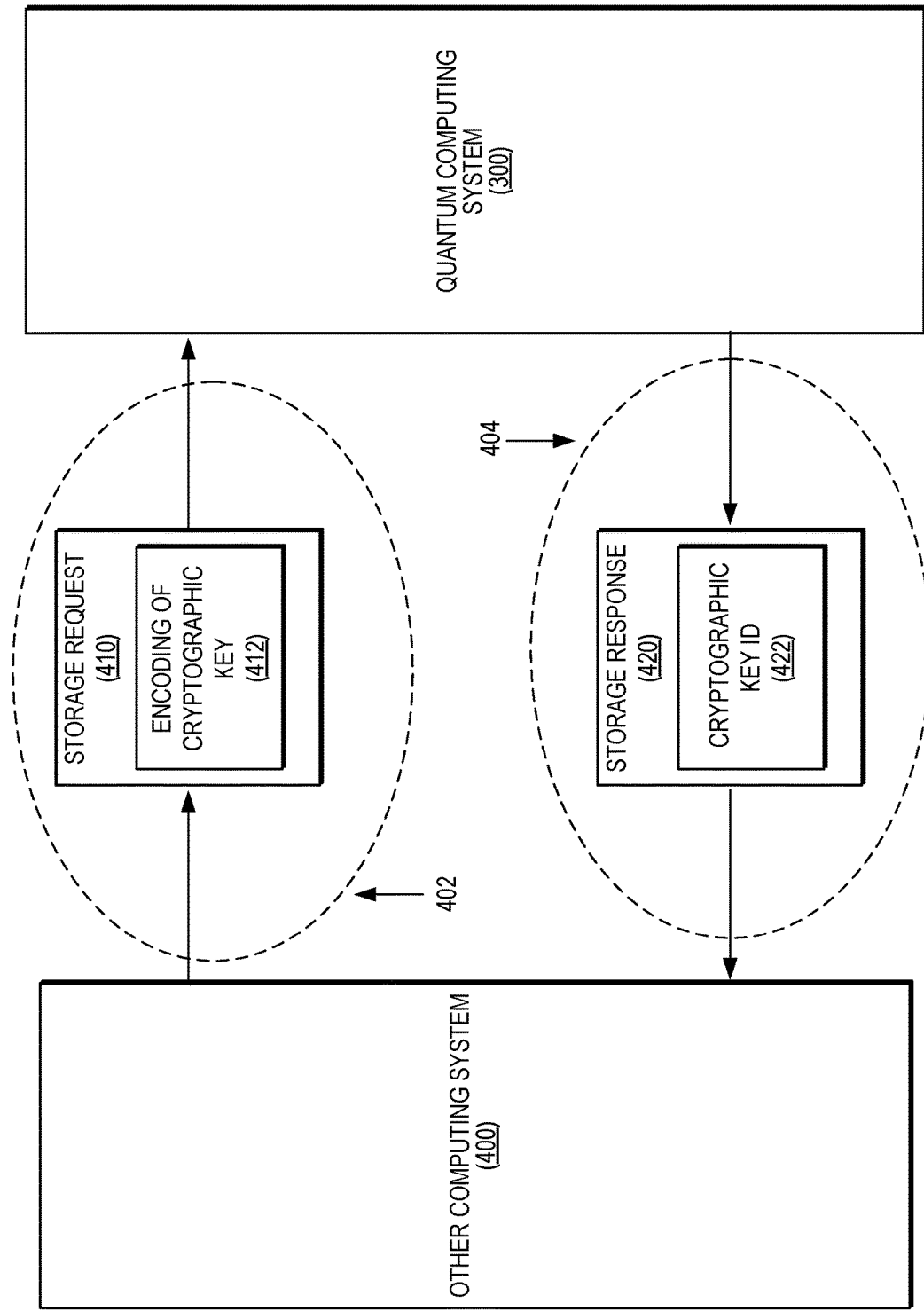
FIG. 4A shows the quantum computing system of FIG. 3 receiving and responding to a cryptographic key storage request, according to various embodiments.
Figure 4B:
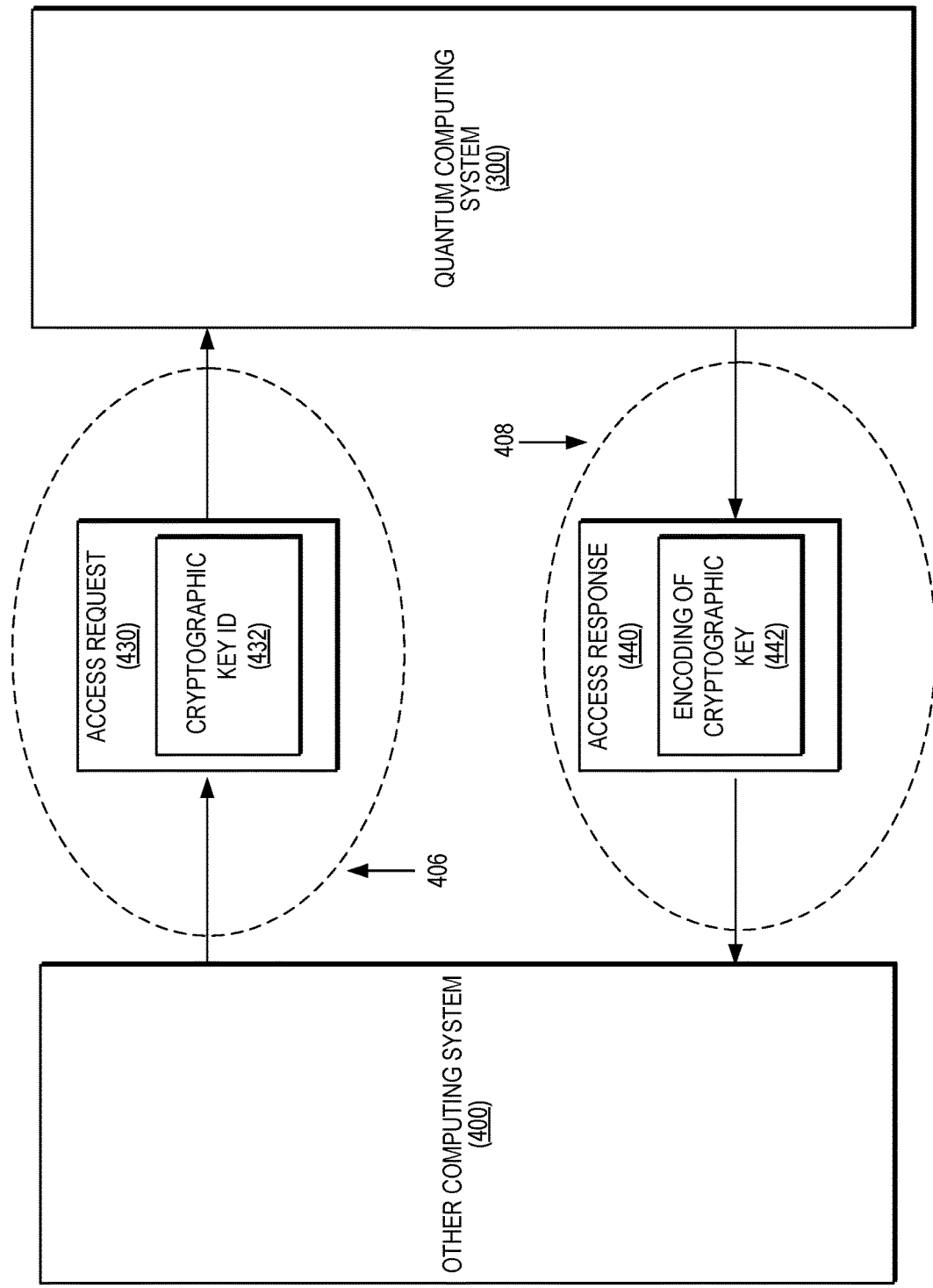
FIG. 4B shows the quantum computing system of FIG. 3 receiving and responding to a cryptographic key access request, according to various embodiments.

FIGS. 4A-4B will now be discussed in conjunction with FIG. 3. FIG. 4A shows the QCS 300 of FIG. 3 receiving and responding to a cryptographic key storage request, according to various embodiments. FIG. 4B shows the QCS 300 of FIG. 3 receiving and responding to a cryptographic key access request, according to various embodiments. Turning attention to FIG. 4A, at step 402, the QCS 300 receives a cryptographic key storage request 410 that includes an encoding of a cryptographic key 412. The storage request 410 is received from another computing system 400. The other computing system 400 may be a quantum computing device and/or system (e.g., the fourth quantum computing device 340 of FIG. 3). In other embodiments, the other computing system 400 may be a classical computing device and/or system (e.g., the classical computing device 360 of FIG. 3). The encoding of the cryptographic key 412 may be a quantum mechanical encoding in qubits that is provided over a quantum channel (e.g., fourth QC 384 of FIG. 3). In such embodiments, the encoding qubits (or quantum states of the encoding qubits) may be transmitted, teleported, and/or swapped via the quantum channel. In other embodiments, the encoding of the cryptographic key 412 may be a classical encoding in classical bits. For instance, the storage request 410 and the encoding of the cryptographic key 412 may be transmitted over a classical network (e.g., classical communication network 362 of FIG. 3).

The QCS 300 may quantum mechanically store the cryptographic key (e.g., the quantum mechanical encoding of the cryptographic key of FIG. 2). The qubits of the encoding may be spatially distributed amongst two or more quantum computing devices of the QCS 300 (e.g., the first quantum computing device 310 of FIG. 3 and the second quantum computing device 320 of FIG. 3). Upon a success storage of the cryptographic key and at step 404, the QCS 300 responds to the other computing system 400 with a cryptographic key storage response 420. The storage response 420 may include a cryptographic key ID 422 that identifies a file, link, or other unique identifier for retrieval of the cryptographic key.

The encoding of the cryptographic key 412 may indicate that the cryptographic key is of length n classical bits, where n is a positive integer. The QCS 300 may store the key in n/2 qubits (e.g., by employing superdense encodings via the superdense encoding/decoding 96 of FIG. 2). The qubit registry service 104 of QCS 300 may determine the number of qubits required for a quantum mechanical encoding, as well as identify, allocate, and register the qubits. The cryptographic key service 92 of FIG. 2 may determine the number of available instances of quantum computing devices in the QCS 300. The quantum mechanical encoding of key may be distributed across multiple quantum computing devices (e.g., the first quantum computing device 310 and the second quantum computing device 320). The spatial distribution of the quantum mechanical encodings may ensure that if a single set of quantum hardware is compromised, the integrity of the encoding of the key is not put at risk, and the key may be accessed with confidence in its fidelity.

A non-limiting example of quantum mechanically storing a cryptographic key is now described. In this non-limiting example, the storage of the key is to be distributed across the first quantum computing device 310 and the second quantum computing device 320 of QCS 300 FIG. 3. In other embodiments, the storage of the key may be distributed across additional and/or alternative quantum computing devices of QCS 300. As shown in step 402 of FIG. 4A, the storage request 410 is received at the QCS 300. The storage request 410 may include (or at least indicate) an encoding of the cryptographic key 412. In the non-limiting embodiment, the encoding of the cryptographic key 412 may be indicated by a set of classical bits included in the storage request 410. In other embodiments, the encoding of the cryptographic key 412 may be indicated by a set of qubits included in the storage request 410 (e.g., delivered over a quantum channel or the quantum states of the set of qubits may be teleported and/or swapped to the QCS 300). In such embodiments, the qubit may be received by a qubit transmission service of the QCS 300 (e.g., qubit transmission service 100 of FIG. 2).

The storage request 410 may be forwarded to a quantum cryptographic key service (e.g., quantum cryptographic key service 92 of FIG. 2) of the QCS 300. In response to receiving the storage request 410, the quantum cryptographic key service may employ a qubit registry service of the QCS 300 (e.g., qubit registry service 104 of FIG. 2) to identify, allocate, and register a first set of allocated qubits (e.g., stored at the first quantum computing device 310) for encoding the cryptographic key. Also, in response to receiving the storage request 410, the qubit registry service may identify, allocate, and register a second set of allocated qubits (e.g., stored at the second quantum computing device 320) for encoding the cryptographic key.

A qubit encoding service of the QCS 300 (e.g., qubit encoding/decoding service 94 of FIG. 2) may encode a first portion of the cryptographic key in the first set of allocated qubits based on a first portion of the encoding of the cryptographic key 412 that corresponds to the first portion of the cryptographic key. Also, the qubit encoding service may encode a second portion of the cryptographic key in the second set of allocated qubits based on a second portion of the encoding of the cryptographic key 412 that corresponds to the second portion of the cryptographic key.

Turning attention to FIG. 4B, at step 406, the QCS 300 receives a cryptographic key access request 430 that includes a cryptographic key ID 432 that identifies a file, link, or other unique identifier for retrieval of the cryptographic key. The access request 430 is received from the other computing system 400 (e.g., the classical computing device 360 of FIG. 3 or the fourth quantum computing device 340 of FIG. 3).

The encoding of the cryptographic key 412 may be a quantum mechanical encoding in qubits that is provided over a quantum channel (e.g., fourth QC 384 of FIG. 3). In such embodiments, the encoding qubits (or quantum states of the encoding qubits) may be transmitted, teleported, and/or swapped via the quantum channel. In other embodiments, the encoding of the cryptographic key 412 may be a classical encoding in classical bits. For instance, the storage request 410 and the encoding of the cryptographic key 412 may be transmitted over a classical network (e.g., classical communication network 362 of FIG. 3).

The QCS 300 may retrieve the quantum mechanically stored cryptographic key (e.g., the quantum mechanical encoding of the cryptographic key of FIG. 2). The qubits of the encoding may have been spatially distributed amongst two or more quantum computing devices of the QCS 300 (e.g., the first quantum computing device 310 of FIG. 3 and the second quantum computing device 320 of FIG. 3). Upon successful retrieval of the cryptographic key and at step 408, the QCS 300 responds to the other computing system 400 with a cryptographic key access response 440. The access response 440 may include an encoding of the cryptographic key 442. The encoding of the cryptographic key 442 may be a quantum mechanical encoding in qubits that is provided over a quantum channel (e.g., fourth QC 384 of FIG. 3). In such embodiments, the encoding qubits (or quantum states of the encoding qubits) may be transmitted, teleported, and/or swapped via the quantum channel. In other embodiments, the encoding of the cryptographic key 442 may be a classical encoding in classical bits. For instance, the access response 440 and the encoding of the cryptographic key 442 may be transmitted over a classical network (e.g., classical communication network 362 of FIG. 3).

When the key is to be retrieved and/or access (e.g., in response to receiving the access request 430), the spatially distributed encoding qubits (or quantum states of the encoding qubits) may be centralized (via qubit transport over quantum channels, teleportation, or qubit swap operations) may be centralized at a single set of quantum hardware (e.g., at the third quantum computing device 330 of FIG. 3). The encoding qubits may be in superposition. In such superposition embodiments, an algorithm that identifies an energy minimum of the encoding qubits (in superposition) may be employed to decode the key (e.g., by measuring the quantum states of the encoding qubits). Once decoded (e.g., generating a classical encoding based on measuring the quantum states of the encoding qubits), the key may be provided to a requesting machine, application, or party by assembling the key fragments in the correct order (e.g., the other computing system 400). In various embodiments, a classical encoding of the key may be provided. In other embodiments, a quantum mechanical encoding may be provided via a quantum channel, quantum teleportation, or qubit swap operation. Thus, the QCS 300 provides an effective means of making the key available to any service within quantum and/or classical computing systems.

A non-limiting example of accessing a cryptographic key that is quantum-mechanically stored via QCS 300 is now described. In this non-limiting example, the storage of the key is distributed across the first quantum computing device 310 and the second quantum computing device 320 of QCS 300 FIG. 3. In other embodiments, the storage of the key may be distributed across additional and/or alternative quantum computing devices of QCS 300. More specifically, a first portion of the cryptographic key is encoded in a first set allocated qubits and a second portion of the cryptographic key is encoded in a second set allocated qubits. The first set of allocated qubits is stored (or located) at the first quantum computing device 310 and the second set of allocated qubits is stored (or located) at the second quantum computing device 320.

As shown in step 406 of FIG. 4B, the access request 430 is received at the QCS 300. The qubit encodings of the cryptographic key may be centralized at the third quantum computing device 330 of the QCS 300. In response to receiving the request, the first quantum computing device 310 may provide a first transmission to the third quantum computing device 330 (e.g., over the first QC 302 of FIG. 3 or over a classical communication network or communication bus). The first transmission may include a (quantum-mechanical or a classical) encoding of the first portion of the cryptographic key. Also, in response to receiving the request, the second quantum computing device 320 may provide a second transmission to the third quantum computing device 330 (e.g., over the second QC 304 of FIG. 3 or over a classical communication network or communication bus). The second transmission may include a (quantum-mechanical or a classical) encoding of the second portion of the cryptographic key.

The third quantum computing device 330 may generate a first encoding of the cryptographic key based on the first transmission from the first quantum computing device 310 and the second transmission from the second quantum computing device 320. The first encoding of the cryptographic key (e.g., the encoding of the cryptographic key 442) may encode at least the first portion of the cryptographic key and the second portion of the cryptographic key.

As shown in step 408, the QCS 300 may provide a third transmission to the other computing system 400. The third transmission may include the access response 440 and be based on the first encoding of the cryptographic key (e.g., the encoding of the cryptographic key 442).

To illustrate exemplary operations performed by the QCS 300 of FIGS. 3-4B, FIGS. 5A-5B provide flowcharts for methods 500 and 520 respectively. Elements of FIGS. 1-4B are referenced in describing FIGS. 3A-3B for the sake of clarity.

Figure 5A:
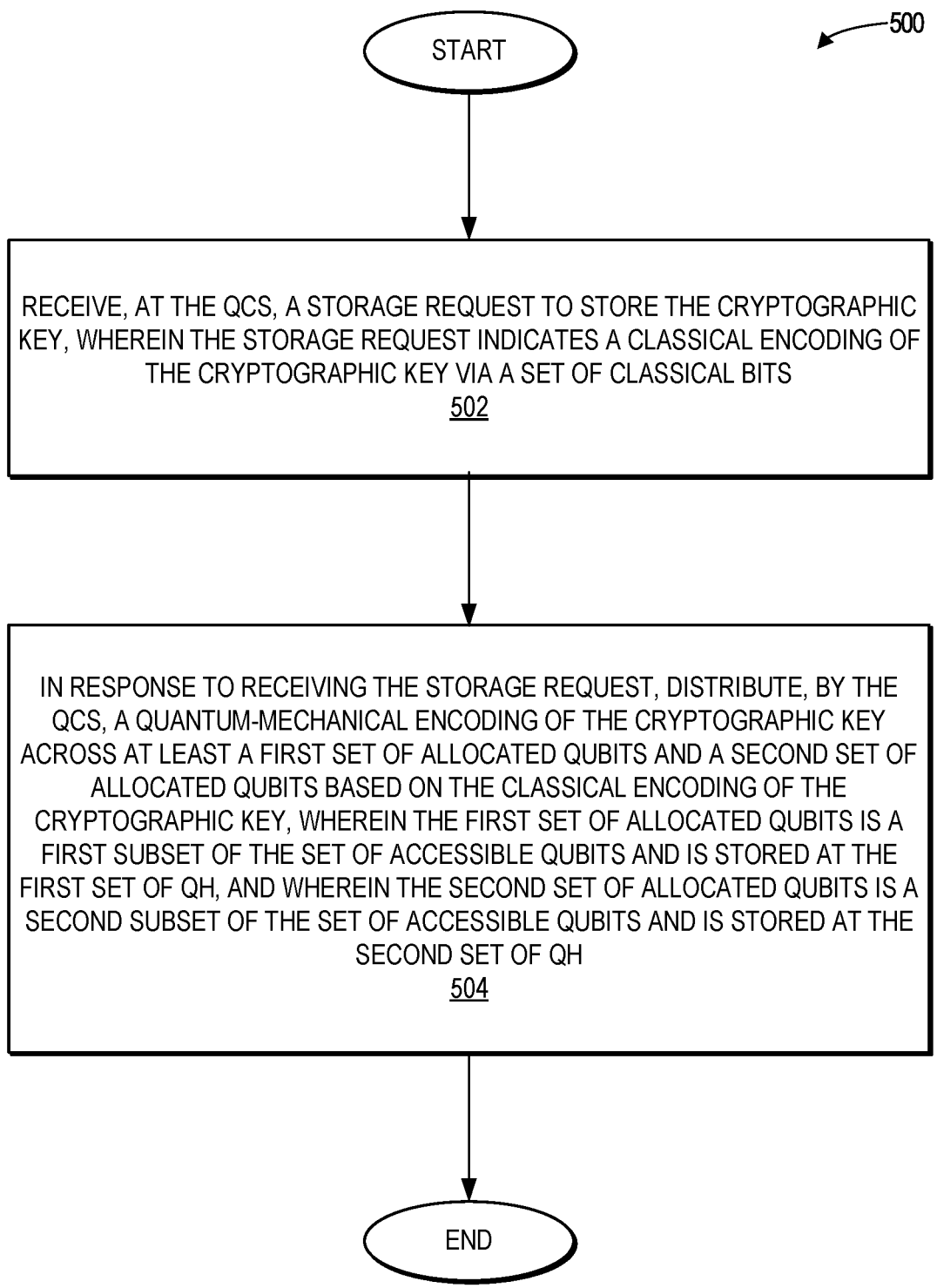
FIG. 5A provides a flowchart for a method for quantum-mechanically storing a cryptographic key at a quantum computing system, according to various embodiments.

FIG. 5A provides a flowchart for a method 500 for quantum-mechanically storing a cryptographic key at a quantum computing system (QCS), according to various embodiments. The QCS may comprise a first set of quantum hardware (QH), a second set of QH, and a set of accessible qubits. Method 500 begins at block 502, where a storage request to store a cryptographic key is received at the QCS. The storage request may indicate a classical encoding of the cryptographic key via a set of classical bits.

At block 504, and in response to receiving the storage request, the QCS may distribute a quantum-mechanical encoding of the cryptographic key across at least a first set of allocated qubits and a second set of allocated qubits. The quantum-mechanical encoding of the cryptographic key may be based on the classical encoding of the cryptographic key. The first set of allocated qubits may be a first subset of the set of accessible qubits. The first set of allocated qubits may be stored at the first set of QH. The second set of allocated qubits may be a second subset of the set of accessible qubits. The second set of allocated qubits may be stored at the second set of QH.

In some embodiments, the method may further include, in response to receiving the storage request, allocating, at the QCS, the first set of allocated qubits. Also, in response to receiving the storage request, the QCS may allocate the second set of allocated qubits. The QCS may encode a first portion of the cryptographic key in the first set of allocated qubits based on a first portion of the classical encoding that corresponds to the first portion of the cryptographic key. The QCS may encode a second portion of the cryptographic key in the second set of allocated qubits based on a second portion of the classical encoding that corresponds to the second portion of the cryptographic key. The quantum-mechanical encoding of the cryptographic key may be a superdense encoding.

Figure 5B:
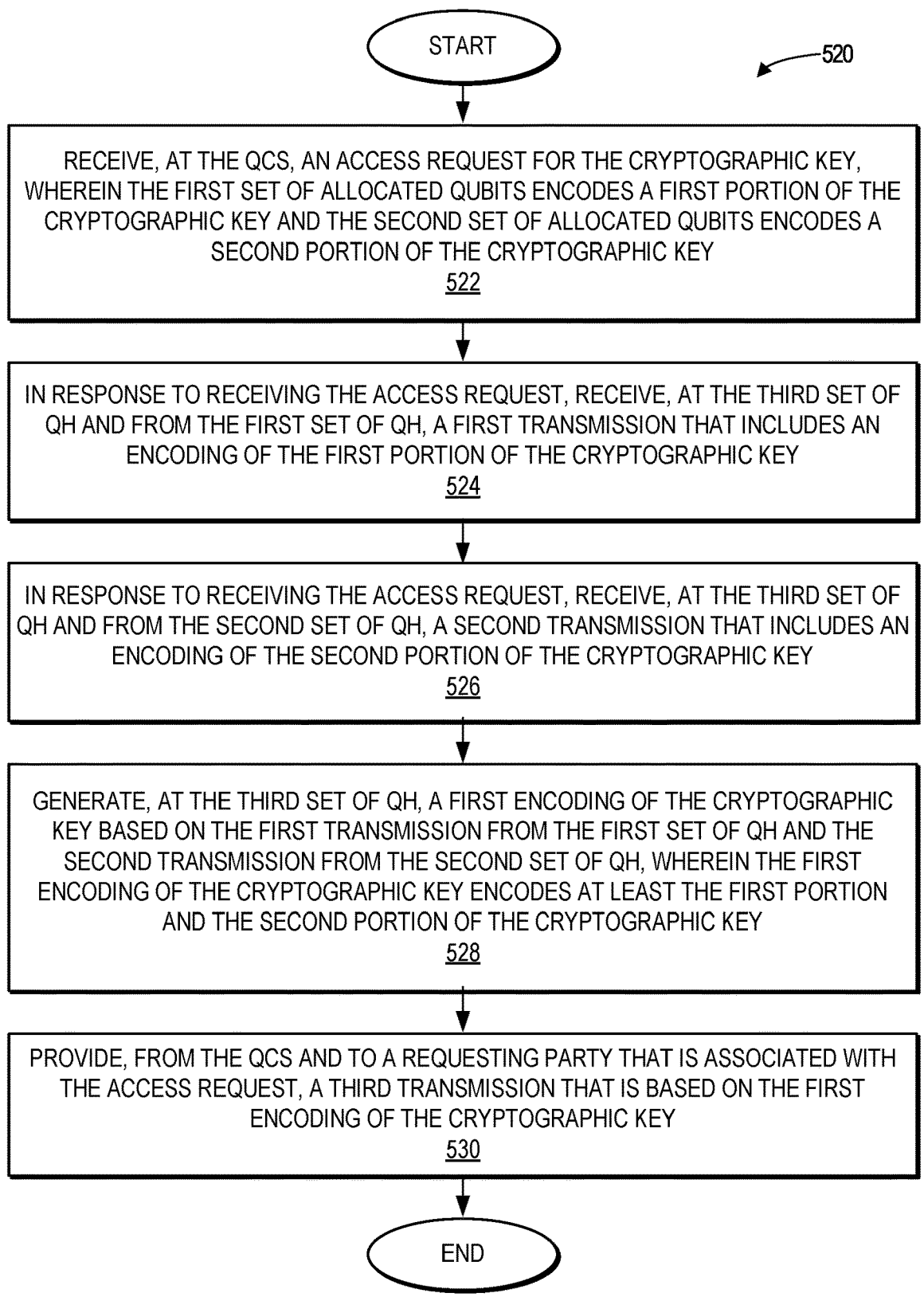
FIG. 5B provides a flowchart for a method for accessing a quantum-mechanical encoding of a cryptographic key at a quantum computing system, according to various embodiments.

FIG. 5B provides a flowchart for a method 520 for accessing a quantum-mechanical encoding of a cryptographic key at a quantum computing system (QCS), according to various embodiments. The QCS may comprise a first set of quantum hardware (QH) that includes a first set of allocated qubits, a second set of QH that includes a second set of allocated qubits, and a third set of QH. Method 520 begins at block 522, where the QCS may receive an access request for the cryptographic key. The first set of allocated qubits may encode a first portion of the cryptographic key. The second set of allocated qubits may encode a second portion of the cryptographic key.

At block 524, and in response to receiving the access request, the third set of QH may receive a first transmission from the first set of QH. The first transmission may include (or indicate) an encoding of the first portion of the cryptographic key.

At block 526, and in response to receiving the access request, the third set of QH may receive a second transmission from the second set of QH. The second transmission may include (or indicate) an encoding of the second portion of the cryptographic key.

At block 528, the QCS may generate a first encoding of the cryptographic key. Generating the first encoding of the cryptographic key may be based on the first transmission from the first set of QH and the second transmission from the second set of QH. The first encoding of the cryptographic key encodes at least the first portion and the second portion of the cryptographic key.

At block 530, the QCS may provide a third transmission to a requesting party that is associated with the access request. The third transmission may be based on the first encoding of the cryptographic key.

Generating the first encoding of the cryptographic key may include forming, at the third set of QH, a set of encoding qubits that encodes at least the first portion and the second portion of the cryptographic key. The QCS may generate the third transmission based on the set of encoding qubits. Providing the third transmission may include the QCS providing the set of encoding qubits to the requesting party via a quantum channel (QC). The QC may be enabled to transmit the set of encoding qubits from the QCS to a fourth set of QH that is associated with the requesting party.

In other embodiments, providing the third transmission may include the QCS providing a set of classical bits to the requesting party via a classical network. The set of classical bits encodes information that enables a quantum teleportation event that transfer a set of quantum states from the set of encoding qubits to another set of quantum states of another set of qubits included in a fourth set of QH that is associated with the requesting party. The other set of qubits may be entangled with a set of ancilla qubits of the QCS. The information encoded in the set of classical bits may be based on measurements of quantum states of the set of encoding qubits and measurements of quantum states of the set of ancilla qubits.

In some embodiments, receiving the first transmission includes receiving the first set of allocated qubits via a first quantum channel (QC) that is enabled to transmit the first set of allocated qubits from the first set of QH to the third set of QC. Receiving the second transmission may include receiving the second set of allocated qubits via a second QC that is enabled to transmit the second set of allocated qubits from the second set of QH to the third set of QC. Generating the first encoding of the cryptographic key may include forming, at the third set of QH, a set of encoding qubits that includes at least the first set allocated qubit and the second set of allocated qubits. Providing the third transmission may include providing the set of encoding qubits to the requesting party via a third QC. The third QC may be enabled to transmit the set of encoding qubits from the QCS to a fourth set of QH that is associated with the requesting party.

In other embodiments, providing the third transmission may include providing, from the QCS, a set of classical bits to the requesting party via a classical network. The set of classical bits encodes information that enables a quantum teleportation event that transfers a set of quantum states from the set of encoding qubits to another set of quantum states of another set of qubits included in a fourth set of QH that is associated with the requesting party.

In some embodiments, receiving the first transmission includes receiving, at the third set of QH and from the first set of QH via a classical network of the QCS, a first set classical bits. The first set of classical bits may enable a first quantum teleportation event that transfers a first set of quantum states from the first set of allocated qubits to a third set of quantum states of a third set of allocated qubits of the third set of QH. Receiving the second transmission may include receiving, at the third set of QH and from the second set of QH via the classical network, a second set classical bits. The second set of classical bits enables a second quantum teleportation event that transfers a second set of quantum states from the second set of allocated qubits to a fourth set of quantum states of a fourth set of allocated qubits of the third set of QH.

Generating the first encoding may include forming, at the third set of QH, a set of encoding qubits that includes at least the third set allocated qubit and the fourth set of allocated qubits. In some embodiments, providing the third transmission may include providing the set of encoding qubits to the requesting party via a quantum channel (QC) that is enabled to transmit the set of encoding qubits from the QCS to a fourth set of QH that is associated with the requesting party.

In other embodiments, providing the third transmission includes providing, from the QCS, a set of classical bits to the requesting party via a classical network. The set of classical bits encodes information that enables a quantum teleportation event that transfers a set of quantum states from the set of encoding qubits to another set of quantum states of another set of qubits included in a fourth set of QH that is associated with the requesting party.

In some embodiments, a first set of quantum states of the first set of allocated qubits includes a first superposition of one or more qubits of the first set of allocated qubits that encodes the first portion of the cryptographic key. A second set of quantum states of the second set of allocated qubits includes a second superposition of one or more qubits of the second set of allocated that encodes the second portion of the cryptographic key. The method may further include determining, at the QCS, the cryptographic key based on identifying a first minimum energy of the first superposition of the one or more qubits of the first set of allocated qubits and identifying a second minimum energy of the second superposition of the one or more qubits of the second set of allocated qubits.

In at least one embodiment, the method further includes receiving, at the QCS, a storage request to store the cryptographic key. The storage request indicates a classical encoding of the cryptographic key via a set of classical bits. In response to receiving the storage request, the QCS may allocate the first set of allocated qubits for encoding the cryptographic key. In response to receiving the storage request, he QCS may allocate the second set of allocated qubits for encoding the cryptographic key. The method further includes encoding, at the QCS, the first portion of the cryptographic key in the first set of allocated qubits based on a first portion of the classical encoding that corresponds to the first portion of the cryptographic key. The QCS may encode the second portion of the cryptographic key in the second set of allocated qubits based on a second portion of the classical encoding that corresponds to the second portion of the cryptographic key.

Figure 6:
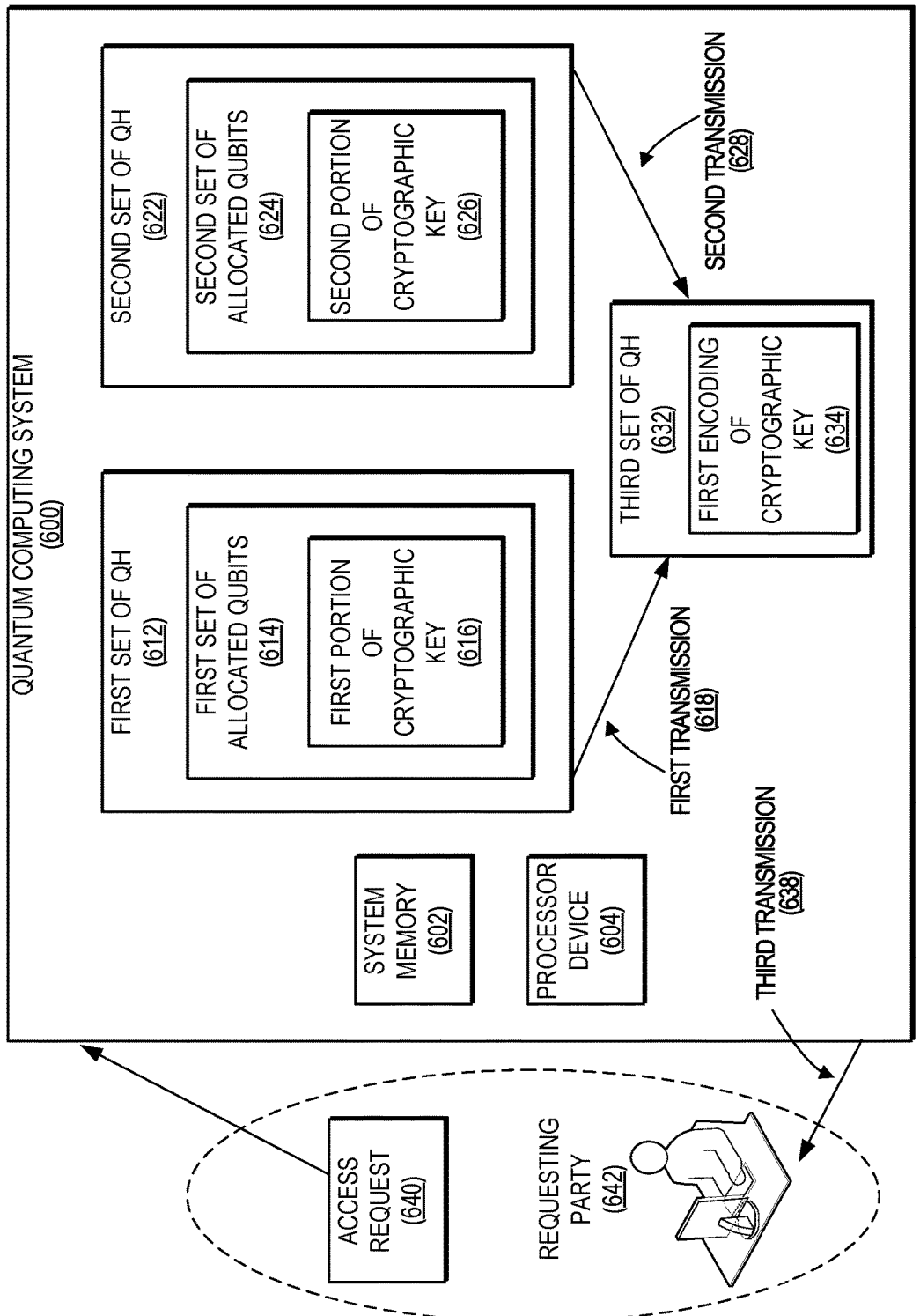
FIG. 6 is a block diagram of another quantum computing system that is similar to the quantum computing system of FIG. 1 that manages cryptographic keys, according to one example.

FIG. 6 is a block diagram of another quantum computing system (QCS) 600 that is similar to the quantum computing system 300 of FIG. 1 that manages cryptographic keys, according to one example. In the example of FIG. 6, the QCS 600 comprises a system memory 602 and a processor device 604. The QCS further comprises a first set of quantum hardware (QH) 612, a second set of QH 622, and a third set of QH 632. The first set of QH 612 includes a first set of allocated qubits 614 that encodes a first portion of a cryptographic key 616. The second set of QH 622 includes a second set of allocated qubits 624 that encodes a second portion of the cryptographic key 626.

The processor device 604 is communicatively coupled to the system memory 602, such that the QCS 600 receives an access request 640 for the cryptographic key. In response to receiving the access request 640, the third set of QH 632 receives from the first set of QH 612, a first transmission 618 that includes an encoding of the first portion of the cryptographic key 616. In response to receiving the access request 640, the third set of QH 632 receives from the second set of QH 622, a second transmission 628 that includes an encoding of the second portion of the cryptographic key 626. The third set of QH 632 generates a first encoding of the cryptographic key 634 based on the first transmission 618 from the first set of QH 612 and the second transmission 628 from the second set of QH 622. The first encoding of the cryptographic key 634 encodes at least the first portion and the second portion of the cryptographic key. The QCS 600 provides a third transmission 638 to a requesting party 642 that is associated with the access request 640. The third transmission 638 is based on the first encoding of the cryptographic key 634.

Individuals will recognize improvements and modifications to the preferred examples of the disclosure. All such improvements and modifications are considered within the scope of the concepts disclosed herein and the claims that follow.

What is claimed is:

1. A method for accessing a cryptographic key that is stored by a quantum computing system (QCS) that comprises a first set of quantum hardware (QH) that includes a first set of allocated qubits, a second set of QH that includes a second set of allocated qubits, and a third set of QH, the method comprising:
   receiving, at the QCS, an access request for the cryptographic key, wherein the first set of allocated qubits encodes a first portion of the cryptographic key and the second set of allocated qubits encodes a second portion of the cryptographic key;
   in response to receiving the access request, receiving, at the third set of QH and from the first set of QH, a first transmission that includes an encoding of the first portion of the cryptographic key;
   in response to receiving the access request, receiving, at the third set of QH and from the second set of QH, a second transmission that includes an encoding of the second portion of the cryptographic key;
   generating, at the third set of QH, a first encoding of the cryptographic key based on the first transmission from the first set of QH and the second transmission from the second set of QH, wherein the first encoding of the cryptographic key encodes at least the first portion and the second portion of the cryptographic key; and
   providing, from the QCS and to a requesting party that is associated with the access request, a third transmission that is based on the first encoding of the cryptographic key.

2. The method of claim 1, wherein generating the first encoding of the cryptographic key comprises:
   forming, at the third set of QH, a set of encoding qubits that encodes at least the first portion and the second portion of the cryptographic key;
   generating, at the QCS, the third transmission based on the set of encoding qubits.

3. The method of claim 2, wherein providing the third transmission comprises:
   providing the set of encoding qubits to the requesting party via a quantum channel (QC) that is enabled to transmit the set of encoding qubits from the QCS to a fourth set of QH that is associated with the requesting party.

4. The method of claim 2, wherein providing the third transmission comprises:
   providing, from the QCS, a set of classical bits to the requesting party via a classical network, wherein the set of classical bits encodes information that enables a quantum teleportation event that transfer a set of quantum states from the set of encoding qubits to another set of quantum states of another set of qubits included in a fourth set of QH that is associated with the requesting party.

5. The method of claim 4, where the other set of qubits is entangled with a set of ancilla qubits of the QCS and the information encoded in the set of classical bits is based on measurements of quantum states of the set of encoding qubits and measurements of quantum states of the set of ancilla qubits.

6. The method of claim 1, wherein
receiving the first transmission includes receiving the first set of allocated qubits via a first quantum channel (QC) that is enabled to transmit the first set of allocated qubits from the first set of QH to the third set of QC; and
receiving the second transmission includes receiving the second set of allocated qubits via a second QC that is enabled to transmit the second set of allocated qubits from the second set of QH to the third set of QC.

7. The method of claim 6, wherein generating the first encoding of the cryptographic key comprises:
forming, at the third set of QH, a set of encoding qubits that includes at least the first set of allocated qubits and the second set of allocated qubits.

8. The method of claim 7, wherein providing the third transmission comprises:
providing the set of encoding qubits to the requesting party via a third QC that is enabled to transmit the set of encoding qubits from the QCS to a fourth set of QH that is associated with the requesting party.

9. The method of claim 7, wherein providing the third transmission comprises:
providing, from the QCS, a set of classical bits to the requesting party via a classical network, wherein the set of classical bits encodes information that enables a quantum teleportation event that transfers a set of quantum states from the set of encoding qubits to another set of quantum states of another set of qubits included in a fourth set of QH that is associated with the requesting party.

10. The method of claim 1, wherein:
receiving the first transmission includes receiving, at the third set of QH and from the first set of QH via a classical network of the QCS, a first set classical bits that enables a first quantum teleportation event that transfers a first set of quantum states from the first set of allocated qubits to a third set of quantum states of a third set of allocated qubits of the third set of QH; and
receiving the second transmission includes receiving, at the third set of QH and from the second set of QH via the classical network, a second set classical bits that enables a second quantum teleportation event that transfers a second set of quantum states from the second set of allocated qubits to a fourth set of quantum states of a fourth set of allocated qubits of the third set of QH.

11. The method of claim 10, wherein generating the first encoding of the cryptographic key comprises:
forming, at the third set of QH, a set of encoding qubits that includes at least the third set of allocated qubits and the fourth set of allocated qubits.

12. The method of claim 11, wherein providing the third transmission comprises:
providing the set of encoding qubits to the requesting party via a quantum channel (QC) that is enabled to transmit the set of encoding qubits from the QCS to a fourth set of QH that is associated with the requesting party.

13. The method of claim 11, wherein providing the third transmission comprises:
providing, from the QCS, a set of classical bits to the requesting party via a classical network, wherein the set of classical bits encodes information that enables a quantum teleportation event that transfers a set of quantum states from the set of encoding qubits to another set of quantum states of another set of qubits included in a fourth set of QH that is associated with the requesting party.

14. The method of claim 1, wherein a first set of quantum states of the first set of allocated qubits includes a first superposition of one or more qubits of the first set of allocated qubits that encodes the first portion of the cryptographic key and a second set of quantum states of the second set of allocated qubits includes a second superposition of one or more qubits of the second set of allocated that encodes the second portion of the cryptographic key.

15. The method of claim 14, further comprising:
determining, at the QCS, the cryptographic key based on identifying a first minimum energy of the first superposition of the one or more qubits of the first set of allocated qubits and identifying a second minimum energy of the second superposition of the one or more qubits of the second set of allocated qubits.

16. The method of claim 1, further comprising:
receiving, at the QCS, a storage request to store the cryptographic key, wherein the storage request indicates a classical encoding of the cryptographic key via a set of classical bits;
in response to receiving the storage request, allocating, at the QCS, the first set of allocated qubits for encoding the cryptographic key;
in response to receiving the storage request, allocating, at the QCS, the second set of allocated qubits for encoding the cryptographic key;
encoding, at the QCS, the first portion of the cryptographic key in the first set of allocated qubits based on a first portion of the classical encoding that corresponds to the first portion of the cryptographic key; and
encoding, at the QCS, the second portion of the cryptographic key in the second set of allocated qubits based on a second portion of the classical encoding that corresponds to the second portion of the cryptographic key.

17. A method for storing a cryptographic key by a quantum computing system (QCS) that comprises a first set of quantum hardware (QH), a second set of QH, and a set of accessible qubits, the method comprising:
receiving, at the QCS, a storage request to store the cryptographic key, wherein the storage request indicates a classical encoding of the cryptographic key via a set of classical bits; and
in response to receiving the storage request, distributing, by the QCS, a quantum-mechanical encoding of the cryptographic key across at least a first set of allocated qubits and a second set of allocated qubits based on the classical encoding of the cryptographic key, wherein the first set of allocated qubits is a first subset of the set of accessible qubits and is stored at the first set of QH, and wherein the second set of allocated qubits is a second subset of the set of accessible qubits and is stored at the second set of QH.

18. The method of claim 17, wherein the method further comprises:
in response to receiving the storage request, allocating, at the QCS, the first set of allocated qubits;
in response to receiving the storage request, allocating, at the QCS the second set of allocated qubits;
encoding, at the QCS, a first portion of the cryptographic key in the first set of allocated qubits based on a first portion of the classical encoding that corresponds to the first portion of the cryptographic key; and encoding, at the QCS, a second portion of the cryptographic key in the second set of allocated qubits based on a second portion of the classical encoding that corresponds to the second portion of the cryptographic key.

19. The method of claim 17, wherein the quantum-mechanical encoding of the cryptographic key is a superdense encoding.

20. A quantum computing system (QCS), comprising:
a first set of quantum hardware (QH) that includes a first set of allocated qubits that encodes a first portion of a cryptographic key;
a second set of QH that includes a second set of allocated qubits that encodes a second portion of the cryptographic key;
a third set of QH;
a system memory; and
a processor device communicatively coupled to the system memory, the processor device to:

receive an access request for the cryptographic key;
in response to receiving the access request, receive, at the third set of QH and from the first set of QH, a first transmission that includes an encoding of the first portion of the cryptographic key;
in response to receiving the access request, receive, at the third set of QH and from the second set of QH, a second transmission that includes an encoding of the second portion of the cryptographic key;
generate, at the third set of QH, a first encoding of the cryptographic key based on the first transmission from the first set of QH and the second transmission from the second set of QH, wherein the first encoding of the cryptographic key encodes at least the first portion and the second portion of the cryptographic key; and
provide, from the QCS and to a requesting party that is associated with the access request, a third transmission that is based on the first encoding of the cryptographic key.

\* \* \* \* \*